P. MOLNÁR.
HORSESHOE.
APPLICATION FILED MAR. 14, 1914.
1,100,487.
Patented June 16, 1914.
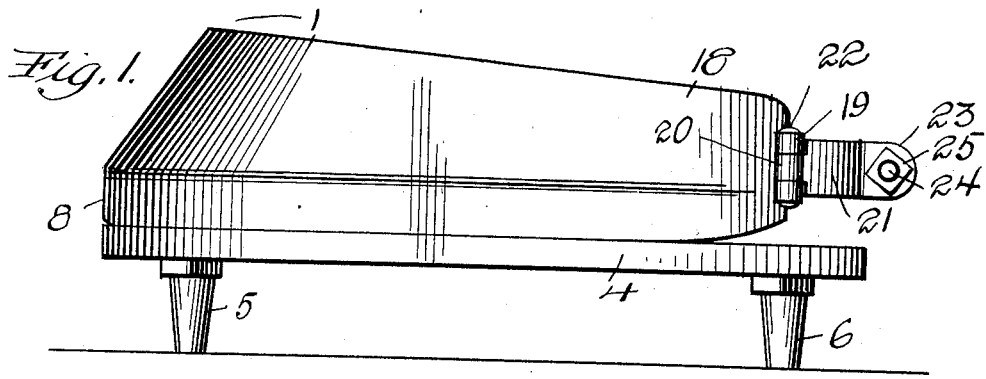
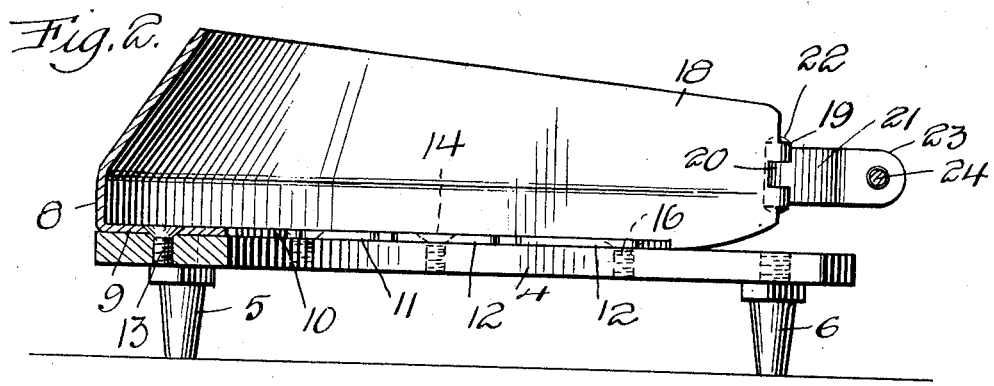
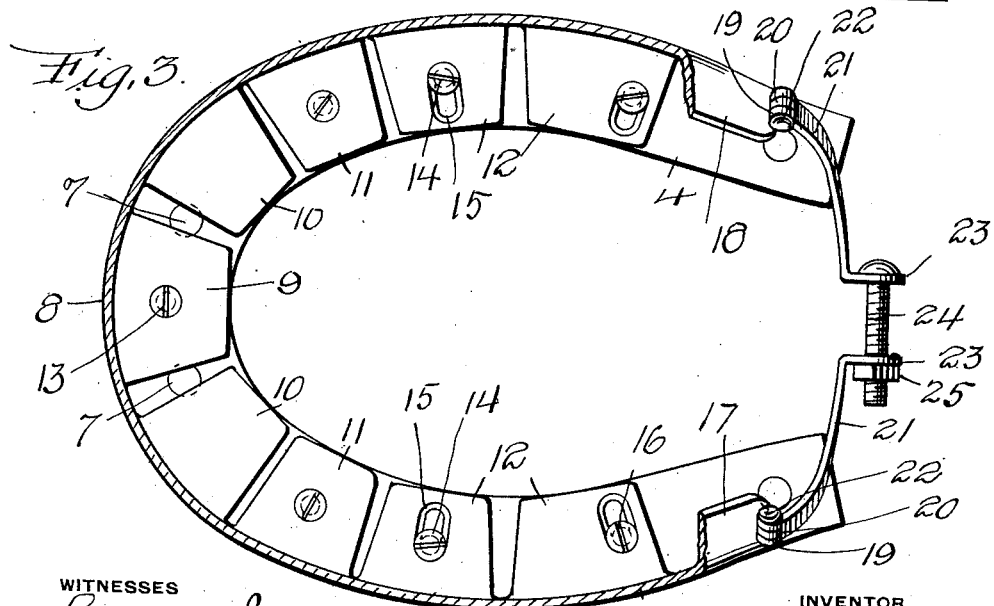
WITNESSES
Samuel Payne
Max H. Srolovitz
INVENTOR
P. Molnár
by Henry C. Evert
ATTORNEY

UNITED STATES PATENT OFFICE.

PAUL MOLNÁR, OF EAST LORAIN, OHIO.

HORSESHOE.

1,100,487.  Specification of Letters Patent.  Patented June 16, 1914.

Application filed March 14, 1914. Serial No. 824,763.

*To all whom it may concern:*

Be it known that I, PAUL MOLNÁR, a subject of the King of Hungary, residing at East Lorain, in the county of Lorain and State of Ohio, have invented certain new and useful Improvements in Horseshoes, of which the following is a specification, reference being had therein to the accompanying drawing.

This invention relates to horse shoes, and has for its object to provide a shoe of such class with means, in a manner as hereinafter set forth, for detachably connecting the shoe to the foot of a horse without the employment of nails.

Another object of the invention is to provide a calked horse shoe having means for detachably and adjustably connecting the shoe to the hoof of the animal without the employment of nails or other devices penetrating the animal's hoofs.

Another object of the invention is to provide a horse shoe, which is simple in its construction and arrangement, strong, durable, efficient and convenient in its use, readily attached to the hoof of the animal, adjustable and inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings, wherein like reference characters denote corresponding parts throughout the several views:—Figure 1 is a side elevation of a horse shoe in accordance with this invention, Fig. 2 is a longitudinal sectional view of a calked horse shoe in accordance with this invention, and Fig. 3 is a sectional plan.

Referring to the drawings in detail, 4 denotes the body portion of the shoe provided with toe calks 5 and heel calks 6, the said calks are provided with shanks 7, which are threaded to the body 4 at the toe and heel thereof.

The attaching means for the calked shoe body consists of a metallic body portion 8, which is perpendicular in vertical section and is formed from metallic material and has projecting inwardly from the lower portion thereof ears 9, 10, 11 and 12. The ears 9 to 12 are mounted upon the upper face of the body portion 4 and the ears 9 and 11 are fixedly secured to the body portion 4 by screws 13 or other suitable devices. Each of the ears 12 is formed with a slot 14, having a beveled wall 15 and extending through said slots and detachably engaging in the body portion 4 are screws 16 which in connection with the slots 14 provide means for adjustably connecting the ears 12 to the body portion 4, whereby said body portion 8 can be bent to conform to the shape of the body portion 4, when occasion so requires.

The heads of the screws 13 as well as the heads of the screws 16, when the said screws are in normal position are flush with the upper faces of the ears 9, 11 and 12.

Screws are not employed for connecting the ears 10 to the body portion 4, but can be if desired. The ears 9 to 12 are arranged in spaced relation with respect to each other so that there will be nothing to interfere with the adjusting of the body portion 8 when occasion so requires. Formed integral with and projecting from the top of the body portion 8 are upwardly extending and inwardly inclined integral holding members 17 and 18 which extend around the hoof of the animal.

The rear end of each of the holding members is provided with a pair of vertically alining barrels 19 and extending between each pair of barrels 19 is a barrel 20 formed on the outer end of a curved transversely extending coupling arm 21. Extending through each barrel 20 and its associate pair of barrels 19 is a pin 22 and by such construction each coupling arm is hinged to holding member 17 or 18.

Each of the coupling arms 21 has its inner end bent at right angles as at 23 and the said angular portions 23 oppose each other, and extending through said angular portions is a headed bolt 24 carrying a nut 25. The bolt and nut 25 provide means for adjustably securing the coupling members 21 together.

What I claim is:—

1. A horse shoe comprising the combination with a shoe body, of a hoof attaching means therefor consisting of a body portion provided with inwardly extending ears seated upon the upper face of the shoe body, means for fixedly securing certain of said ears to the shoe body, means for adjustably securing others of said ears to the shoe body, upwardly extending and inwardly inclined holding members projecting from said body portion and adapted to extend around the hoof of the animal, coupling members hinged to certain of said holding members, and means for adjustably connecting said coupling members.

2. A horse shoe comprising the combination with a shoe body, of a hoof attaching means therefor consisting of a body portion provided with inwardly extending spaced ears seated upon the shoe body, certain of said ears being fixedly secured to the shoe body and others of said ears adjustably connected to the shoe body, holding members projecting from said body portion, a pair of inwardly extending curved coupling members hinged to certain of said holding members and provided at their inner ends with angular portions, and means carried by said angular portions for adjustably connecting the members together.

In testimony whereof I affix my signature in the presence of two witnesses.

PAUL MOLNÁR.

Witnesses:
TÁNAS GVUNDA,
STEVE MOLNÁR.

Copies of this patent may be obtained for five cents each, by addressing the "Commissioner of Patents, Washington, D. C."